United States Patent [19]

Anselmo et al.

[11] 3,818,462

[45] June 18, 1974

[54] NOISE IMMUNE I.C. MEMORY CELL

[75] Inventors: Robert A. Anselmo, Canastota, N.Y.; Walter S. Gontowski, Jr., North Grosvenordale, Conn.

[73] Assignee: Sprague Electric Company, North Adams, Mass.

[22] Filed: June 4, 1973

[21] Appl. No.: 366,881

[52] U.S. Cl. .......... 340/173 FF, 180/82 C, 307/288, 307/291, 340/52 E, 340/278

[51] Int. Cl... G11c 11/40, H03k 3/286, B60r 21/10

[58] Field of Search ............ 340/173 FF, 52 E, 278; 307/238, 288, 291; 180/82 C

[56] References Cited

UNITED STATES PATENTS

| | | | |
|---|---|---|---|
| 3,391,311 | 7/1968 | Lin et al. | 340/173 FF |
| 3,546,682 | 12/1970 | Cagnac et al. | 340/173 FF |
| 3,767,944 | 10/1973 | Stehlin | 307/291 |

*Primary Examiner*—Bernard Konick
*Assistant Examiner*—Stuart N. Hecker

[57] ABSTRACT

An integrated circuit bistable memory cell is described having a trigger threshold that is proportional to the power supply voltage. This threshold to power supply ratio may readily be adjusted over a broad range by adjustments in the design of the comprising integrated components. Further disclosure is made of an integrated seat belt interlock circuit for use in automobiles, employing the above mentioned memory cell having a high threshold and a high immunity to noise.

3 Claims, 2 Drawing Figures

NOISE IMMUNE I.C. MEMORY CELL

BACKGROUND OF THE INVENTION

This invention relates to electronic memory and logic circuits, and more particularly to circtuis having a threshold guarding against inadvertent switching due to noise.

Conventional circuits also feature a threshold, some large and some very small, which the signal must exceed before triggering action can be effected. The triggering threshold acts as a guard against false triggering from signal line noise. For use in a high noise environment, a high threshold is desirable. A variety of means have been used for establishing a threshold in flip flop circuits, including use of a self biasing common emitter resistor, separate bias networks, or diodes placed in series with the trigger input. The magnitude of the threshold is inevitably a function of the transistors' characteristics such as $V_{BE}$, $h_{oe}$, $\beta$, and/or $h_{ie}$ which in turn are a function of temperature and/or operating conditions. When the stability or control of the threshold is especially important, as for the case where the circuit must operate reliably in a high noise environment, it is desirable to make the threshold independent of transistor parameters, and when the circuit is to be constructed in integrated circuit form, this goal becomes even more urgent. When a trigger amplifier or inverting switching circuit is employed in conjunction with the flip flop, and connected to a common power supply, $V_{cc}$, one of the two normal outputs of this trigger circuit to the flip flop would normally be proportional to the supply voltage. Thus, it would be desirable that the flip flop threshold also be proportional to the supply voltage, so that the "window" through which legitimate switching may occur, is also proportional to the magnitude of the supply voltage. The window may otherwise disappear for low supply voltage.

Therefore, it is an object of the present invention to provide a flip flop memory cell, whose trigger threshold is relatively independent of transistor characteristics and temperature variations.

It is a further object of this invention to provide a flip flop memory cell whose threshold varies proportionally with the supply voltage.

It is a further object of this invention to provide a memory cell having high immunity to noise.

These and other objects of this invention will become apparent in the following description.

SUMMARY OF THE INVENTION

An integrated bistable memory cell is described, having two current-source-transistor pairs being interconnected in conventional Ecles Jordan flip flop fashion and each having an active current source load. Also described is a logic circuit in association with the aforementioned memory cell, providing high noise immunity and being especially suitable for use as an auto seat belt interlock control circuit.

DESCRIPTION OF THE PREFERRED EMBODIMENTS

Figure 1:
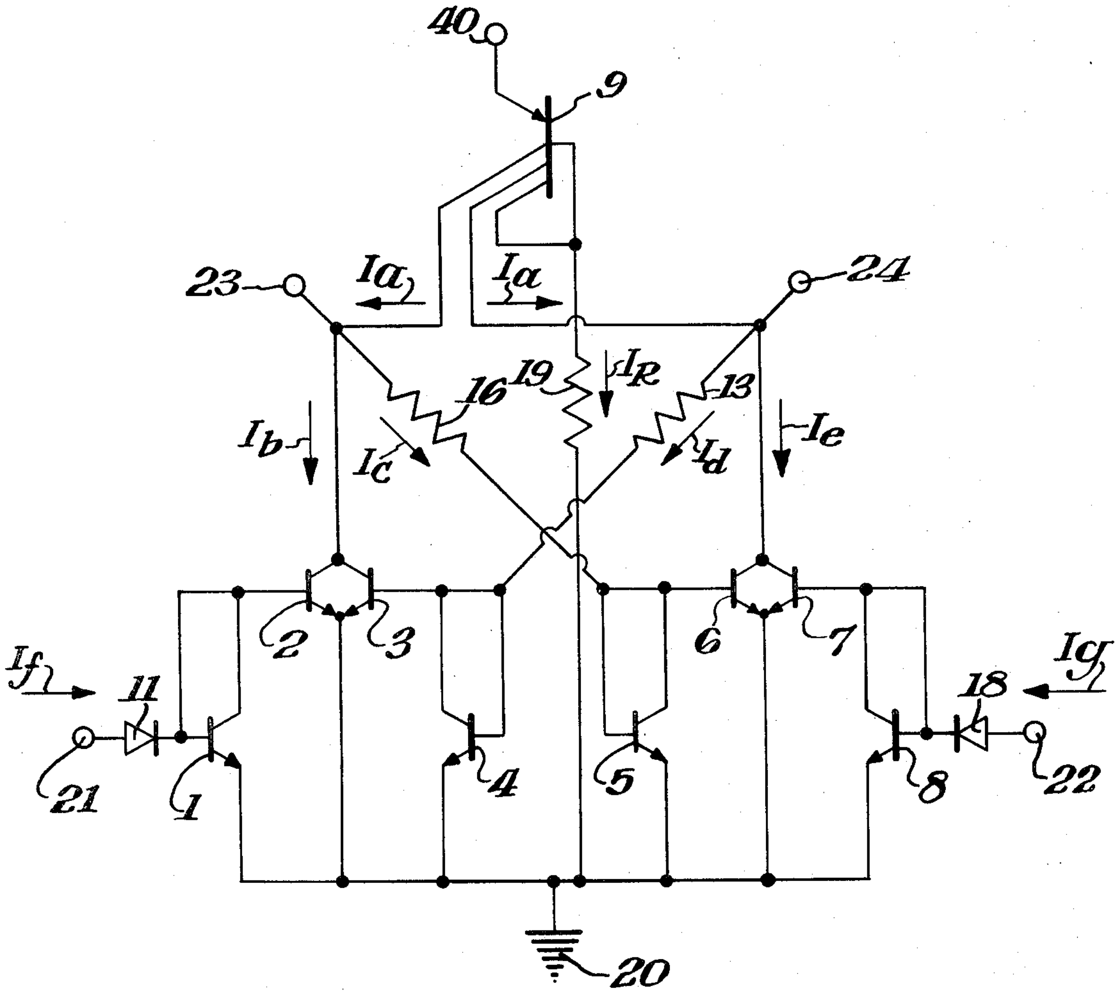
In FIG. 1 is shown a circuit diagram of a first preferred embodiment of a bistable memory cell of this invention.

A first preferred embodiment of an electronic bistable memory cell is shown in diagrammatic form in FIG. 1. Transistors 3 and 6 represent the usual two complementary switching elements. The base of each is tied as usual to the collector of the other through resistors 13 and 16, and thus when one is conducting, the other is not. The collector loads are, in this embodiment, so called active loads, each being comprised of a current source and each delivering the same amplitude of current $I_a$. The multiple collector PNP transistor 9 forms the two current source loads by having a third collector tied to the base and having a resistor 19 from base to ground. The reference current $I_r$ in resistor 19, by means known to those skilled in the art, establishes the amplitude of the currents $I_a$. The ratio of $I_r$ to $I_a$ is proportional to the ratio of the geometric length of the respective collector elements in the transistor 9. A voltage ($V_{cc}$) power supply (not shown) is connected with positive polarity to terminal 40 and to the emitter of transistor 9. The negative polarity of the power supply is connected to the circuit ground 20.

Transistor 4 is connected as a diode and further connected such that its emitter-base junction parallels the emitter-base junction of transistor 3. Transistor 5 has the same circuit relationship with transistor 6.

The aforementioned circuit elements are adjusted such that, with transistor 6 conducting and in saturation, the current $I_e$ flows from collector to emitter through transistor 6 and to ground 20. Further, current $I_d$ in resistor 13 is zero and $I_e = I_a$. Output terminal 24 is therefore at about +0.2V and by connection through resistor 13, transistor 3 is cut off. Therefore $I_b = 0$ and $I_c = I_a$. Most of the current $I_c$ flows through the diode connected transistor 5 to ground 20 holding transistor 6 in saturated conduction. The circuit is adjusted so that the voltage drop between output terminal 23 and the power supply terminal 40 is less than a fraction of a volt and transistor 9 is just operating in the active region.

The other stable state of this symmetrical memory cell occurs when transistor 3 is conducting and transistor 6 is off.

Transistor 6 is held in saturation by the current $I_c$ provided $I_c\,(A_6/A_5) \geqslant I_a$, where $A_6$ and $A_5$ represent the relative geometric areas of the emitter junctions of transistors 6 and 5, respectively. The symbol $\geqslant$ means greater than or equal to. In this stable state, transistors 2 and 3 are cut off and not conducting, and $I_c = I_a$. Therefore $A_6/A_5 \geqslant 1$ is a necessary condition for stability.

The foregoing analysis assumes that the values of resistors 16 and 13 are the same as resistor 19. In practice, however, it is desirable to make resistors 13 and 16 larger than resistor 19 to reduce the loading at the collectors of transistors 6 and 3. For this and other reasons the value of resistors 13 and 16 in this embodiment are each made twice the value of resistor 19. A corresponding change in the design of transistor 19 is necessary whereby collector elements connected as flip-flop loads are each half the length of the collector element connected to the base, such that $I_r = 2I_a$. In order to account for the remaining loading due to current drawn in resistors 6 and 3 are each made three times greater than that of transistors 5 and 4, respectively. Thus $$A_6/A_5 = 3 = A_3/A_4.$$

A transistor 2 is connected in parallel with transistor 3 from collector to emitter. A transistor 1 is diode connected with its base tied to its collector and its base to emitter junction paralleling that of transistor 2. A diode 11 is connected to the base of transistor 1 such that a current $I_f$ may be introduced at terminal 21 and through diode 11. This input current $I_f$ flows mainly through the diode connected transistor 1 to ground 20 thus bringing transistor 2 into conduction. The memory cell is about to be switched to its other stable state.

In the collector of transistor 2, a current $I_b$ begins to flow. Transistor 2 is now in an active or linear mode of operations, as distinguished from the saturation mode in which mode transistor 6 now operates.

The circuit configuration of transistors 1 and 2 will be hereinafter called a current-source-pair, and it has found wide usage in recent years in linear integrated circuits. See New Developments in I.C. Voltage Regulators, IEEE Journal of Solid State Circuits, Vol. SC6, No. 1, February, 1971, by Robert J. Widlar; and pages 10–15 in the 1970 edition of Handbook of Semiconductor Electronics by L. P. Hunter. The pair is particularly effective in an integrated circuit (I. C.), where the transistors are simultaneously formed and therefore precisely matched so that the emitter-base voltage differential, $V_{BE_1}$ is highly oredictable from one "matched" transistor to the other in the same I.C. This pair is conventionally used in linear circuit applications where the second transistor operates in its active region such that the ratio of collector currents is equal to the ratio of the areas of the emitter junctions of the two transistors. The phrase, "the open collector of the current source pair" will be used herein to mean the collector of the active transistor (e.g. current-source-pair comprising diode-connected transistor 1 and active transistor 2).

As $I_f$ increases, transistors 1 and 2 begin to conduct. Note the Kirchoff current relationships $I_a = I_b + I_c$ and similarly $I_a = I_d + I_e$. Transistor 2 begins to draw current $I_b$ and since $I_a$ is a regulated current, $I_e$ diminishes, transistor 6 leaves saturation, and $I_e = I_c\ (A_6/A_5) = I_a$. But, $A_6/A_5 = 3$ from before. Further, $I_a - I_b = I_c$ and these relations together give $I_b = (2/3)\ I_a$. At this instant during the early portion of the change in state of the flip flop the following relationships hold to at least a close approximation: $I_a = I_d + I_e = I_b + I_c$ and since $A_6/A_5 = 3$ from before $I_e = I_a = 3I_c$ and also $I_b = I_a - I_c = I_a - 1/3\ I_a = (2/3)\ I_a$. Since transistor 3 is still not yet conducting, the current $I_b$ flows only through transistor 2, so $I_f = (2/3)\ I_a\ (A_1/A_2)$.

The value of $I_f$ in the above equation corresponds to the maximum signal that will not switch the flip-flop. This critical trigger value of $I_f$ depends upon the choice of the ratio $A_1/A_2$. If for example it is desired to use a trigger source having about the same source impedance as the value of resistor 19 ($R_{19}$), and if it is desired to trigger the flip flop with a voltage of about $V_{cc}/2$, then since $I_a = V_{cc} - V_{BE}/R_{19}$, it must be true that $I_f = V_{cc} - V_{BE}/2R_{19}$ and so $I_f = (1/2)\ I_a$.

But $I_f = (2/3)\ I_a\ (A_1/A_2)$ from above so, $A_1/A_2 = 3/4$. Thus the input trigger level may be adjusted in design over a wide range of voltages and currents with the ratio $A_1/A_2$ being a key design variable. High noise immunity at the inputs to the memory cell is thus achieved. Another current-source-pair, comprised of transistors 7 and 8, bears the same connective and operationsl relationships to current-source-pair 5 and 6.

The result is an unusually stable memory cell having a surprising immunity to noise, whether generated in the power supply, in the ground system or at the inputs, or a combination thereof.

The reference current in reference resistor 19 is essentially proportional to the supply voltage, $V_{cc}$. In the above analysis it can be seen that the triggering threshold is directly proportional to the current flowing in the active half of the flip flop, which is directly related to the reference current. Therefore an increase in supply voltage causes a proportional increase in the trigger threshold current. Thus this circuit provides against false triggering from transient changes or slow variations in the power supply voltage, and further guards against the smultaneous combination of noise at the trigger inputs and noise in the power supply.

It is also seen that the threshold is relatively independent of transistor characteristics. The current gain $\beta$ is the factor of most significance. As long as it exceeds about 20, the loop gain is so large that the magnitude of the threshold is not affected.

Therefore, the circuit threshold is sensitive to temperature variations, essentially only to the extent that resistor values change with temperature. Known methods of controlling their temperature coefficients may be used to obtain integrated resistors of any needed quality for this purpose.

Figure 2:
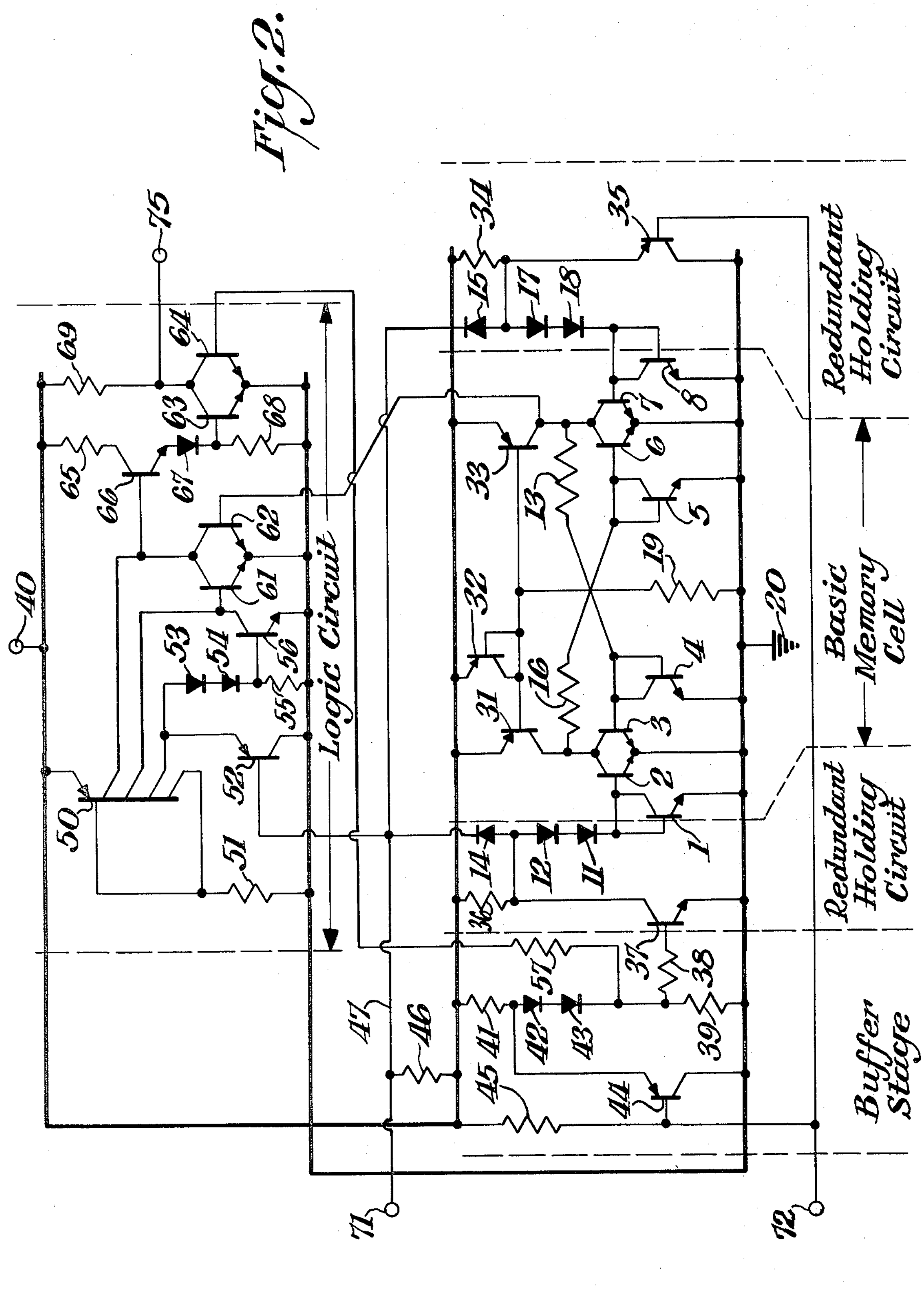
In FIG. 2 is shown a circuit diagram of a second preferred embodiment of this invention comprising a bistable memory cell with holding circuits, a buffer stage, and a logic circuit; for use as a seat belt interlock integrated circuit.

In FIG. 2 is shown a second preferred embodiment of the present invention. The power supply voltage, $V_{cc}$, is connected with positive side to terminal 40 and negative side to ground terminal 20. The basic bistable memory cell is comprised of transistors 1 through 8 and resistors 16 and 13, all interconnected as in FIG. 1. The constant current active loads in FIG. 2, however, are formed by employing the current source pair technique, earlier described, whereby the two active transistors 31 and 33 deliver a constant current to the parallel transistors 2 and 3 and to the parallel transistors 6 and 7, respectively. The active transistors 31 and 33 share a diode connected transistor 32, the three bases being connected to reference resistor 19 whose other end is connected to ground 20. The design and operation of the memory cell circuit of FIG. 2 is, with exception of the equivalent active loads, exactly the same as was previously described for the cell of FIG. 1.

It will be shown in the further description of the circuit of FIG. 2, how the special advantages of the noise immune memory cell is used in an automobile seat belt interlock integrated circuit. This practical circuit represents a high noise environment application, especially relating to noise transients that may exist in the ground circuit external to the IC and in series with the input signals to the IC.

When the driver of the automobile occupies his seat, a mechanical switch (not shown) is closed, connecting terminal 72 to ground 20. Before he is seated, the switch is open and resistors 45 and 34 hold the bases of transistors 44 and 35, respectively, at the positive power supply potential ($+V_{cc}$).

Thus, a seated driver causes transistors 44 and 35 to conduct. Since transistor 35 is connected as an emitter follower, having its emitter resistor tied to $V_{cc}$, the further result from a driver being seated is for transistor pair 7 and 8 to be cut off. This pair was originally conducting, helping to preserve the original stable state of the memory cell in the presence of electrical distrubances and noise. Since transistor 44 is connected as an emitter follower having emitter resistor 41 tied to $V_{cc}$, the further result is for transistor 37 to be cut off. Thus, transistor pair 1 and 2 are brought into conduction by a current from $+V_{cc}$ through resistor 36 and diodes 11 and 12 to the bases of the pair. The effect of bringing pair 1 and 2 into conduction is to cause the memory cell to change state by electrical events previously described in explanation of FIG. 1. The cell is made free to switch since the pair 7 and 8 are simultaneously made non-conducting.

Alternatively, if the driver leaves his seat, terminal 72 returns to $V_{cc}$ potential, transistor 44 cuts off, and transistor 37 conducts. Simultaneously, transistor 35 is cut off, causing pair 7 and 8 to conduct and the memory cell to change states. When transistor 37 is conducting, about 0.2V is dropped across its collector and emitter, holding the pair 1 and 2 in cut off. Thus the cell is made free to switch.

The trigger circuitry of FIG. 2 just described, that has essentially been added relative to the basic memory cell of FIG. 1, adds further immunity from noise to the memory cell. Before the driver occupant switch is closed, the cell is urged into the stable state by conducting pair 7 and 8, where pair 5 and 6 conduct and pair 3 and 4 are off. The conventional feed back circuitry at the heart of the cell itself provides a good measure of stability. Pair 7 and 8 remain conducting further insuring stability and immunity against inadvertent switching due to noise from any source.

The memory cell input pairs 1 and 2, and 7 and 8 are thus seen to serve in a dual role. The pairs each cooperate within the basic memory cell, as was described in explanation of the first preferred embodiment, to provide a high threshold to noise signals at the basic memory cell inputs. It is also been that these same pairs in this second preferred embodiment may cooperate to redundantly hold the cell in a stable state by means external to the basic cell. Thus the inverting stage comprised of transistor 37, and the emitter follower stage comprised of transistor 35 are referred to herein as redundant holding circuits. The emitter follower stage comprising transistor 44 acts as a buffer amplifier stage.

A second mechanical switch, in the driver seat belt (not shown), is closed when the belt is buckled. This switch is connected between terminals 71 and ground 20. The electrical buss 47 of the IC, associated with terminal 71 is held at $+V_{cc}$ potential by resistor 46 as long as the seat belt switch is open. This buss 47 is connected to diodes 14 and 15. These diodes 14 and 15 are made non-conducting when the seat belt switch is open. Closure of the seat belt switch causes diodes 14 and 15 to conduct and hold the bases of pairs 1 and 2, and 7 and 8 near ground potential. Thus the aforementioned redundant holding circuits now act in a new mode whereby the inputs to the basic memory cell are essentially shorted to ground and the cell is not subject to changing states even if the driver occupant switch is opened or there is noise in the input circuits that are associated with the first mechanical switch.

In FIG. 2 there is also shown a fault logic circuit comprised of a multiple collector current source transistor 50, logic transistors 52, 56, 61, 62, 66, 63, and 64, and an output terminal 75. By means of resistor 58 connecting the output of the emitter follower buffer transistor 44 to an input of the logic circuit, the transistor 64 is caused to conduct when the driver occupant switch is open and therefore the output voltage at terminal 75 is near ground potential or zero. Alternatively when the driver occupant switch is closed, the transistor 64 is cut off. By means of a connection being made between the base of transistor 62 and an output of the memory cell, nemaly at the collector of transistor 6, transistor 62 will be conducting when transistors 6 and 7 are not conducting, and the opposite condition is also true. When transistor 62 conducts, transistor 66 is cut off as is transistor 62. Otherwise transistor 63 will conduct causing the output voltage at terminal 75 to fall near zero. By means of a direct connection between buss 47 and the base of transistor 52, an open seat belt switch puts buss 47 at $+V_{cc}$ potential holding off transistor 52 and permitting transistor 56 to conduct and cut off transistor 61. If transistor 62 is also off, the potential at output terminal 75 is held near zero.

A truth table can now be drawn up to relate the output at terminal 75 to the condition of the two switches. It will be recognized that the sequence in which the switches are closed becomes a factor in the truth table relationship and therefore the sequences are shown as a proper sequence X, and an improper sequence Y. A "1" designates an output at terminal 75 of near $+V_{cc}$ and an "0" contrarily indicates a near zero voltage at terminal 75. A closed switch condition is designated by a "1" and an open switch by an "0."

| | Occupant Condition | Seatbelt Condition | Output(75) Condition |
|---|---|---|---|
| X | 0 | 0 | 0 |
| | 1 | 0 | 1 |
| | 1 | 1 | 0 |
| Y | 0 | 0 | 0 |
| | 0 | 1 | 0 |
| | 1 | 1 | 1 |

The output may be connected to an alarm and/or a relay that when activated and for output condition "0" opens the automobile ignition start circuit. The purpose of this ignition interlock system as shown in FIG. 2, is to encourage the use of seat belts.

The circuit of FIG. 2, in fact, is only a portion of an integrated circuit that has been constructed. Two other identical circuits are also incorporated in the same IC, each to be associated with the two other front seat passenger positions. The transistors are formed in epitaxial silicon of 1 ohm-centimeter resistivity and thickness of about 10 microns. Base depth was 3 microns. NPN base width is 0.5 microns and PNP base width is 15 microns. Transistors 1, 4, 5 and 8 have the same emitterbase area. Transistors 2 and 7 have twice that area, and transistors 3 and 6 have three times that area. The ratio of the emitter-base areas of transistors 32 and 31 (or 33) is two to one. The current gain, $\beta$, is 20 to 200 at 100 microamperes of collector current for NPN transistors while corresponding figures for the PNP transistors $\beta$ is 2 to 50, at 50 microamperes. $BV_{ceo}$ is greater than 6 volts for all transistors. The circuit is designed to use a 6 volt power supply. All resistors are ion implanted. The resistor values are given in tabular form below:

| | Resistor | Value (Ohms) |
|---|---|---|
| 97R | 13 | 100K |
| 96R | 16 | 100K |
| 98R | 19 | 50K |
| 101R | 34 | 40K |
| 95R | 36 | 40K |
| 94R | 38 | 1K |
| 91R | 39 | 20K |
| 92R | 41 | 20K |
| 90R | 45 | 4K |
| 89R | 46 | 4K |
| 83R | 51 | 60K |
| 84R | 55 | 20K |
| 93 | 57 | 1K |
| 85R | 65 | 20K |
| 86R | 68 | 20K |
| 87R | 69 | 10K |

The basic bistable memory cell used in the seat belt interlock circuit of FIG. 2, and as described with reference to the first preferred embodiment and FIG. 1, has an input signal switching threshold that is proportional to the power supply voltage, and furthermore is adjustable in design over an exceptionally wide range. For the interlock circuit of FIG. 2, it was designed to be half the power supply voltage. It has been shown in laboratory models that the threshold may be designed to be within 1 volt of the power supply voltage. In comparison it should be noted that guaranteed noise immunity in typical CMOS circuits is about 1.50 volts for a 5V power supply. Noise immunity of DTL and TTL circuits are typically 0.4 volt with a power supply voltage of 5 volts. Besides lacking design versatility, these thresholds are relatively low. Zener diodes may be employed to raise the threshold but such methods are not easy to achieve in integrated form except for voltages around 6.5 volts, and further produce a threshold against noise that is fixed and not proportional to the power supply voltage. The memory cell of this invention advantageously incorporates a high threshold inherently, and is readily designed and produced in integrated form.

What is claimed is:

1. An integrated circuit bistable memory cell comprised of:

a. a first and second current-source-pair of transistors;

b. a first coupling resistor connecting the bases of said first pair to the open collector of said second pair, in conventional bistable circuit fashion;

c. a second coupling resistor connecting the bases of said second pair to the open collector of said first pair, in conventional bistable circuit fashion;

d. a third current-source-pair wherein the collector of the active transistor is connected to said collector of said first pair;

e. a fourth current-source-pair wherein the collector of the active transistor is connected to said collector of said second pair;

f. a ground connection being made to all transistor emitters of said pairs;

g. two terminals for connecting a d.c. voltage power supply to said integrated circuit, one terminal of which connects to said ground connection;

h. a constant current active load comprised of one or more transistors and a reference resistor, being connected between the other terminal for said power supply and the open transistor collectors of said first and third pairs; and i. another constant current active load comprised of one or more transistors and a reference resistor, being connected between said other terminal of said power supply and the open collectors of said second and fourth pairs;

wherein a one stable operating state consists in said first pair conducting and said second pair being cut off; another stable operating state consists in said second pair conducting and said first pair being cut off; and a signal current may be applied to the bases of said fourth pair causing said memory cell to switch from said one stable state to said other stable state when said signal amplitude exceeds the characteristic circuit threshold value of said cell, said threshold value being substantially proportional to said power supply voltage, and similarly a signal current may be applied to the bases of said third pair causing said memory cell to switch from said other stable state to said one stable state.

2. The memory cell of claim 1 having:

a. a first redundant holding circuit comprised of a normal signal inverting stage whose emitter is grounded and whose output is connected to the bases of said first pair;

b. a second redundant holding circuit comprised of an emitter follower stage whose output is connected to the bases of said second pair and whose collector is grounded such that for voltages or impedances above a certain level at the input of said second holding circuit, said cell remains in or switches to said other stable operating state;

c. a buffer stage comprised of an emitter follower whose output is tied to the input of said first redundant holding circuit, such that for voltages or impedances below a certain level at the input of said buffer, said cell remains in or changes to said one stable operating state;

d. a first input terminal connected to said input of said buffer stage and said input of said second redundant holding circuit, such that a first external switch may be connected between said first input terminal and circuit ground, and said cell always assumes said other stable operating state if said first switch is open and contrarily said cell switches to said one stable state if said first switch is closed;

e. a second input terminal; and f. a disabling circuit comprised of a network of diodes connecting between each of said redundant holding circuits and said second input terminal, such that a second external switch may be connected between said second input terminal and circuit ground, and if said second switch is closed, said holding circuits block out said input signals and noise to said cell, and further such that for either condition of said second switch, any noise introduced in said disabling circuit cannot effect a change in said state of said cell.

3. A memory cell of claim 2 having a logic circuit connected to said second input terminal, to said open collector of said first or second pair, and to said output of said buffer; wherein said output of said logic circuit may be connected to an alarm device and said logic output voltage level is a function of the positions of said first and second external switches and the time sequence by which they are opened and closed.

* * * * *